3,099,671
PREPARATION OF ORGANOSILANES

Philip D. George, Schenectady, N.Y., assignor to General Electric Company, a corporation of New York
No Drawing. Filed Dec. 19, 1955, Ser. No. 553,743
5 Claims. (Cl. 260—448.2)

This invention relates to the preparation of silanes by the simultaneous reduction, cleavage, and redistribution of organopolysiloxanes. More particularly, this invention is concerned with the process of preparing silanes containing only methyl groups and hydrogen atoms bonded to silicon, which method comprises heating a methylpolysiloxane in the presence of an alkali metal hydride.

In the accepted commercial methods for the production of organosilanes, reaction is generally effected between silicon and alkyl halides to form organosilicon compounds which contain alkyl groups and halogen atoms bonded to silicon. By these commercial methods of preparation, silanes containing only methyl and hydrogen attached to silicon are rarely formed. Since silanes such as tetramethylsilane, trimethylsilane, and dimethylsilane, are very useful in the art, it is desirable to provide a method for preparing these compounds which is related to the commercial methods of preparation of other organosilicon compounds, particularly organopolysiloxanes.

Accordingly, it an object of the present invention to provide a method for the preparation of silanes containing only methyl and hydrogen groups bonded to silicon which is adapted to supplement the commercial methods of preparation of organosilicon compounds.

A further object of the present invention is to provide a method for preparing silanes containing only methyl and hydrogen radicals attached to silicon from methylpolysiloxanes which are commercial available.

These and other objects of my invention are accompolished or heating a methylpolysiloxane at a temperature of from about 200 to 300° C. in the presence of an alkali metal hydride such as lithium hydride, sodium hydride or cesium hydride.

In the commercial preparation of organosilicon compounds, as previously mentioned, the primary products are methylchlorosilanes. In the preparation of organopolysiloxanes, particularly methylpolysiloxanes, from these methylchlorosilanes, the latter compounds are hydrolyzed and condensed to form the methylpolysiloxanes. The process of the present invention is then applied to these methylpolysiloxanes to form compounds containing only methyl and hydrogen attached to silicon such as tetramethylsilane, trimethylsilane, and dimethylsilane.

Although the preparation of methylchlorosilanes and the hydrolysis of these compounds to organopolysiloxanes is well known in the art, attention is directed towards Rochow Patents 2,380,995 and 2,483,373, Patnode Patent 2,380,997 and Rochow et al. Patent 2,380,996 for further details on the preparation of the methylchlorosilanes by the reaction of silicon with alkyl chlorides. Further information on the preparation of methylpolysiloxanes from the methylchlorosilanes is found, for example, in Patnode Patents 2,469,888 and 2,469,890 as well as in "An Introduction to the Chemistry of Silicones," E. G. Rochow, Second Edition, John Wiley & Sons, Inc., New York (1951).

The organopolysiloxanes which are reacted with an alkali metal hydride by the process of the present invention include methylpolysiloxanes having the formula (1) $(CH_3)_n SiO_{\frac{4-n}{2}}$ where $n$ has a value of from 1 to 3, inclusive. These organopolysiloxanes may thus be considered as the hydrolyzate of methylchlorosilanes such as methyltrichlorosilane, dimethyldichlorosilane, and trimethylchlorosilane and mixtures of these various methylchlorosilanes. Thus, the hydrolyzates within the scope of Formula 1 where $n$ has a value of from about 1 to less than 2 more completely described in Rochow Patents 2,258,218–2,258,222. Compounds within the scope of Formula 1 where $n$ has a value of about 2, e.g., from about 1.98 to 2.01, are described in the aforementioned book, "An Introduction to the Chemistry of Silicones," and include such materials as the relatively low molecular weight cyclic dimethylpolysiloxanes such as heptamethylcyclotrisiloxane, octamethylcyclotetrasiloxane, decamethylcyclopentasiloxane, etc. In addition, materials within the scope of Formula 1 when $n$ is equal to about 2 include high molecular weight organopolysiloxane gums, such as the gum prepared by effecting reaction between a cyclic dimethylsiloxane such as octamethylcyclotetrasiloxane, and an organopolysiloxane rearrangement and condensation catalyst such as cesium hydroxide, potassium hydroxide, solid benzyl trimethyl ammonium hydroxide, tetra-n-butyl phosphonium hydroxide, ferric chloride, etc.

Examples of compounds within the scope of Formula 1 where $n$ has a value greater than 2, e.g., from about 2.01 to 3, may be found in the aforementioned Patnode Patents 2,468,888 and 2,469,890. These methylpolysiloxane fluids generally comprise trimethylsilyl chain-stopped linear methylpolysiloxanes, for example, hexamethyldisiloxane, octamethyltrisiloxane, as well as higher linear or branched-chain trimethylsilyl chain-stopped methylpolysiloxane fluids.

Although I do not wish to be bound by theoretical considerations, I believe that the mechanism involved in the process of my invention comprises a cleavage, a reduction, and a disproportionation. Thus, it is believed that the alkali metal hydride, particularly sodium hydride, causes a cleavage of silicon-oxygen linkages of the methylpolysiloxanes with the formation of silicon-hydrogen linkages and silicon-oxygen-sodium linkages. This process is repeated with each siloxane linkage to result in silanes containing silicon-bonded methyl radicals, silicon-bonded hydrogen, and silicon-bonded NaO linkages. To explain the fact that some of the silanes of the present invention contain more silicon-bonded methyl radicals than the number of methyl radicals attached to silicon in the starting methylpolysiloxanes, a redistribution of methyl radicals must take place during the reaction. Thus, if the cleavage product of hexamethyldisiloxane is one molecule of trimethylsilane and one molecule of trimethylsilyloxy sodium, a methyl radical from one of these two silanes must replace the hydrogen or NaO group on the other silane.

The reaction of the present invention is carried out by merely mixing the organopolysiloxane with the alkali metal hydride and heating the mixture. In cases where the organopolysiloxane is a solid material, it is desirable to disperse the alkali metal hydride in the solid material as well as possible. Thus, where the organopolysiloxane is a gum or elastomeric material, I prefer to mill the alkali metal hydride into the methylpolysiloxane. Where the organopolysiloxane is a resinous material, and in the solid state, I prefer to grind the resin with the alkali metal hydride. After mixing the methylpolysiloxane and the alkali metal hydride, the mixture is heated at a temperature of from about 200° C. to about 300° C. At temperatures below about 200° C. no appreciable reaction takes place. While reaction does take place at temperatures above 300° C., it has been observed that some decomposition and cleavage of silicon-carbon linkages occurs. Therefore, I prefer to keep within the range of 200–300° C. Since the products of the reaction are vapors or gases at the reaction temperature, it is desirable to conduct the reaction in a closed reaction vessel so as to preclude the loss of these vapors or gases. However, it should be understood that when employing as starting materials methylsiloxanes which do not vaporize at the reaction temperature, the reaction may be conducted under atmospheric pressure and the gaseous reaction products may be collected in any suitable condensing apparatus.

In carrying out the process of the present invention the ratio of ingredients may vary within wide limits. Thus, I may employ either a small or a large excess of either of the two reactants. However, since one molecule of alkali metal hydride reacts with every two atoms of silicon, I prefer to employ the reactants in this proportion. Where an excess of the alkali metal hydride is employed, the reaction generally occurs at a faster rate so that the preferred range of sodium hydride to organopolysiloxane is from about 1 to 1.5 molecules of alkali metal hydride per 2 atoms of silicon in the methylpolysiloxane.

The following examples are illustrative of the practice of my invention and are not intended for purposes of limitation.

*Example 1*

Into a glass lined autoclave were placed 50 grams (0.31 mole) of hexamethyldisiloxane and 8 grams (0.33 mole) of sodium hydride. The autoclave was then sealed and heated at a temperature of about 200° C. The pressure in the autoclave was initially 200 p.s.i. when a temperature of 200° C. had been reached, but the pressure then rose to 320 p.s.i. after several hours. The autoclave was then cooled and vented through two Dry Ice traps. The autoclave was then connected to a vacuum pump through a liquid nitrogen trap, and evacuation of the autoclave resulted in the condensation of a liquid in the nitrogen trap. This liquid was then fractionally distilled in a Podbielniak low temperature column. This fractional distillation resulted in tetramethylsilane which boiled at about −11 to −5° C. at 200 mm. and trimethylsilane which boiled at −27 to −26° C. at 200 mm. Both of these products were identified by mass spectrometric analysis. In addition, the identity of the trimethylsilane was further confirmed by infra-red analysis.

*Example 2*

A glass lined autoclave was charged with 50 grams (0.169 mole) of octamethylcyclotetrasiloxane and 8 grams (0.33 mole) of sodium hydride. The autoclave was then sealed and heated at a temperature of about 300° C. Following the procedure of Example 1, the autoclave was vented through Dry Ice traps and then subjected to a vacuum to condense the product in a liquid nitrogen trap. The fractional distillation of the liquid in the trap through a low temperature Podbielniak column resulted in trimethylsilane which boiled at about −11° C. at 400 mm., dimethylsilane which boiled at about −35° C. at 400 mm. and tetramethylsilane. The identities of these products were determined by their infra-red spectra.

Although the present invention has been described only in connection with methylpolysiloxanes, the process is also applicable to organopolysiloxanes containing silicon-bonded organic groups other than methyl. Thus, the organopolysiloxane may comprise methylethylpolysiloxanes, methylphenylpolysiloxanes, phenylethylpolysiloxanes, diphenylpolysiloxanes, methylchlorophenylpolysiloxanes, methylvinylpolysiloxanes, etc. And although the examples have described the use of sodium hydride only, it should be understood that other alkali metal hydrides such as lithium hydride may be employed with success.

The organosilanes containing only methyl, and hydrogen attached to silicon are valuable in the typical silane applications. Thus, these materials may be employed as dielectric media in gas-filled transformers and cables and the like. In addition, these compounds may be employed as intermediates in the preparation of more complex silicon derivatives.

What I claim as new and desire to secure by Letters Patent of the United States is:

1. The process of simultaneously cleaving, reducing and redistributing methylpolysiloxanes which comprises heating a methylpolysiloxane which contains from 1 to 3, inclusive, methyl groups per silicon atom in the presence of from about 1 to 1.5 molecules an alkali metal hydride per two silicon atoms in said methylpolysiloxane at a temperature of from 200–300° C.

2. The process of claim 1 in which the alkali metal hydride is sodium hydride.

3. The process of forming tetramethylsilane and trimethylsilane from hexamethyldisiloxane which comprises heating hexamethyldisiloxane at a temperature of from 200–300° C. in the presence of from about 1 to 1.5 molecules of sodium hydride per two silicon atoms in said hexamethyldisiloxane.

4. The process of preparing tetramethylsilane, trimethylsilane, and dimethylsilane which comprises heating octamethylcyclotetrasiloxane at a temperature of from 200–300° C. in the presence of from about 1 to 1.5 molecules of sodium hydride per two silicon atoms in said octamethylcyclotetrasiloxane.

5. A process which comprises reacting hexamethyldisiloxane with about an equimolecular amount of an alkali metal hydride at a temperature of 200° to 300° C.

References Cited in the file of this patent
UNITED STATES PATENTS
2,759,007    Dunham et al. _____ Aug. 14, 1956